US011798442B2

(12) United States Patent
Ahire et al.

(10) Patent No.: US 11,798,442 B2
(45) Date of Patent: Oct. 24, 2023

(54) INTERIOR UPRIGHT FOR RUNWAY GUIDANCE SIGN

(71) Applicant: Eaton Intelligent Power Limited, Dublin (IE)

(72) Inventors: Mohan Ahire, Pune (IN); Ishwari Ramesh Marne, Pune (IN); Amol Anil Khalkar, Nasik (IN); Hemraj Thorat, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/452,384

(22) Filed: Oct. 26, 2021

(65) Prior Publication Data

US 2022/0130290 A1    Apr. 28, 2022

Related U.S. Application Data

(60) Provisional application No. 63/106,234, filed on Oct. 27, 2020.

(51) Int. Cl.
*G09F 13/04* (2006.01)
*B64F 1/00* (2006.01)

(52) U.S. Cl.
CPC .......... *G09F 13/0413* (2013.01); *B64F 1/002* (2013.01); *G09F 13/0472* (2021.05)

(58) Field of Classification Search
CPC ..... G09F 13/0413; G09F 13/0472; B64F 1/00
See application file for complete search history.

(56) References Cited

U.S. PATENT DOCUMENTS

| 3,390,259 | A | * | 6/1968 | Angier | G09F 13/0413 40/578 |
| 4,287,555 | A | * | 9/1981 | Stilling | G09F 13/0413 362/225 |
| 4,331,270 | A | * | 5/1982 | Humlong | B62J 9/27 224/463 |
| 7,134,764 | B1 | | 11/2006 | Bieberdorf | |
| 7,244,042 | B1 | * | 7/2007 | Bieberdorf | B64F 1/18 362/183 |
| 7,377,062 | B2 | * | 5/2008 | Ellerton | G09F 13/04 40/564 |
| 2011/0023338 | A1 | | 2/2011 | Ellerton | |
| 2018/0212116 | A1 | * | 7/2018 | Bastiani | G08G 5/065 |

FOREIGN PATENT DOCUMENTS

KR    200415027 Y1    4/2006

OTHER PUBLICATIONS

Extended European Search Report for corresponding Application No. 21205099.1, dated Mar. 17, 2022, 9 pages, Munich, Germany.

* cited by examiner

*Primary Examiner* — Gary C Hoge
(74) *Attorney, Agent, or Firm* — Stinson LLP

(57) ABSTRACT

A runway guidance sign includes a housing defining an interior space and an opening at a front side. The housing includes opposite upper and lower walls. An interior upright is received in the interior space of the housing. The interior upright is fastened to and extends between the upper and lower walls. The interior upright is integrally formed from a one-piece sheet of material.

20 Claims, 7 Drawing Sheets

INTERIOR UPRIGHT FOR RUNWAY GUIDANCE SIGN

CROSS-REFERENCE TO RELATED APPLICATION

This application claims priority to U.S. Provisional Patent Application Ser. No. 63/106,234, filed Oct. 27, 2020, and which is hereby incorporated by reference in its entirety.

FILED OF THE DISCLOSURE

The present disclosure generally relates to an interior upright for runway guidance sign.

BACKGROUND OF THE DISCLOSURE

Guidance signs are designed for use on airport runways to mark taxi routes and/or taxiways/runways intersections. As an example, colors may be black on yellow, yellow on black, or white on red depending on the application as defined by the governing standards such as FAA AC 150/5345-44K. A conventional guidance sign may include a generally rectangular housing having opposite upper and lower walls, opposite side walls, and a rear wall. The upper, lower, and side walls define an opening at a front side in which a sign panel is received. An interior upright within the housing extends between the upper and lower walls to provide upright to the upper wall. The interior upright being made of multiple components formed separately and fastened to one another using fasteners.

SUMMARY

In one aspect, a runway guidance sign generally comprises a housing defining an interior space and an opening at a front side. The housing includes opposite upper and lower walls. An interior upright is received in the interior space of the housing. The interior upright is fastened to and extends between the upper and lower walls. The interior upright is integrally formed from a one-piece sheet of material.

In another aspect, an interior upright for a runway guidance sign having a housing with upper and lower walls generally comprises a vertical body that is generally planar. The vertical body has opposite side faces and upper and lower ends. At least one upper fastening tab extends outward from at least one of the opposite side faces at the upper end of the vertical body. The at least one upper fastening tab is configured to be fastened to the upper wall of the housing of the runway guidance sign. At least one lower fastening tab extends outward from at least one of the opposite side faces at the lower end of the vertical body. The at least one lower fastening tab is configured to be fastened to the lower wall of the housing of the runway guidance sign. The interior upright is sized and shaped to be disposed between the upper and lower walls of the housing of the runway guidance sign and provide load-bearing support to the upper wall. The interior upright is integrally formed from a one-piece sheet of material.

In yet another aspect, a method of making a runway guidance sign generally comprises forming a housing defining an interior space and an opening at a front side. The housing includes opposite upper and lower walls. The method further comprises forming an interior upright from a one-piece sheet of metal. The interior upright includes a vertical body that is generally planar. The vertical body has opposite side faces and upper and lower ends. At least one upper fastening tab extends outward from at least one of the opposite side faces at the upper end of the vertical body. At least one lower fastening tab extends outward from at least one of the opposite side faces at the lower end of the vertical body. The method further comprises fastening the at least one upper fastening tab to the upper wall of the housing within the interior space of the housing, and fastening the at least one lower fastening tab to the lower wall of the housing within the interior space of the housing.

DETAILED DESCRIPTION OF THE DISCLOSURE

Figure 1:
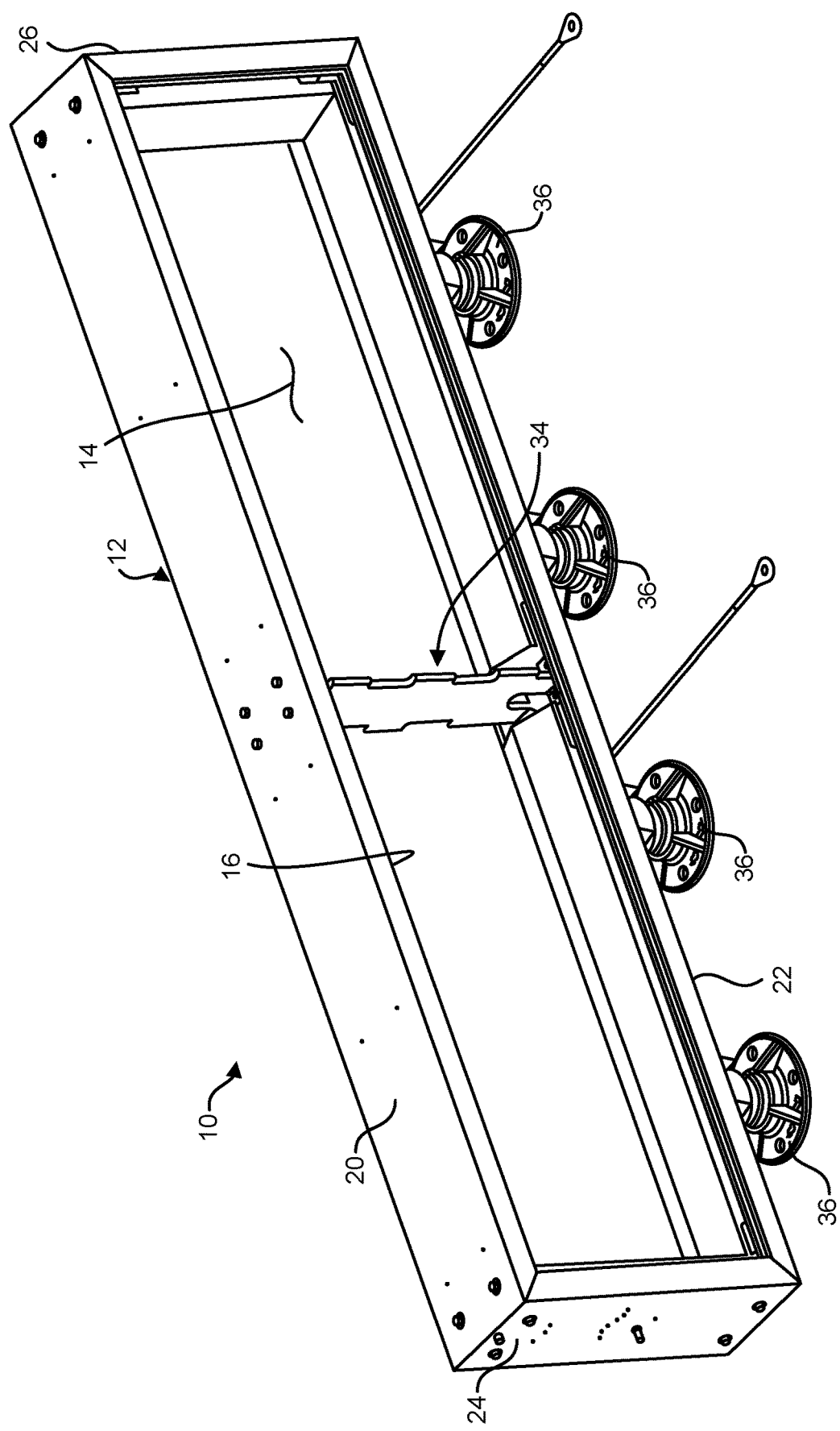
FIG. 1 is a perspective of a guidance sign including an interior upright within an interior of a housing of the guidance sign.
Figure 2:
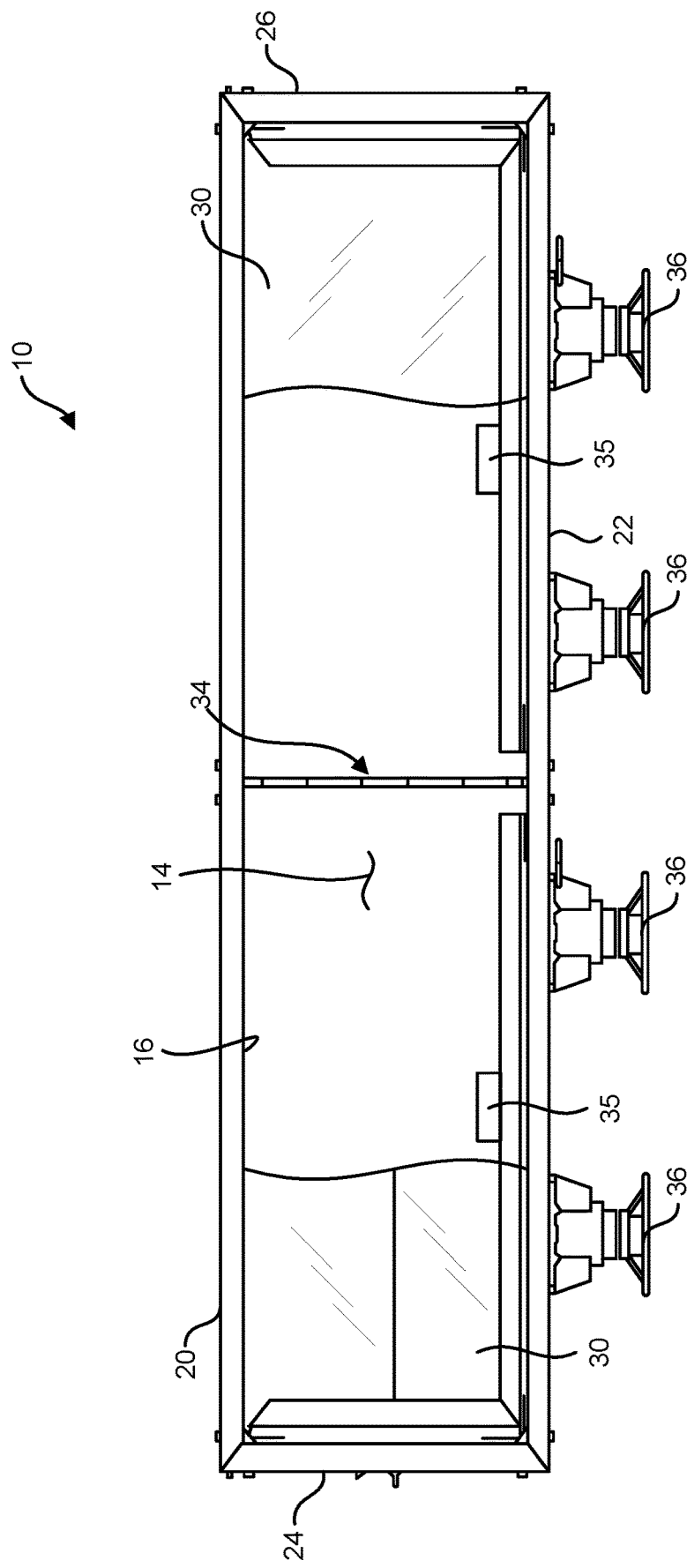
FIG. 2 is a front elevation of the guidance sign.
Figure 3:
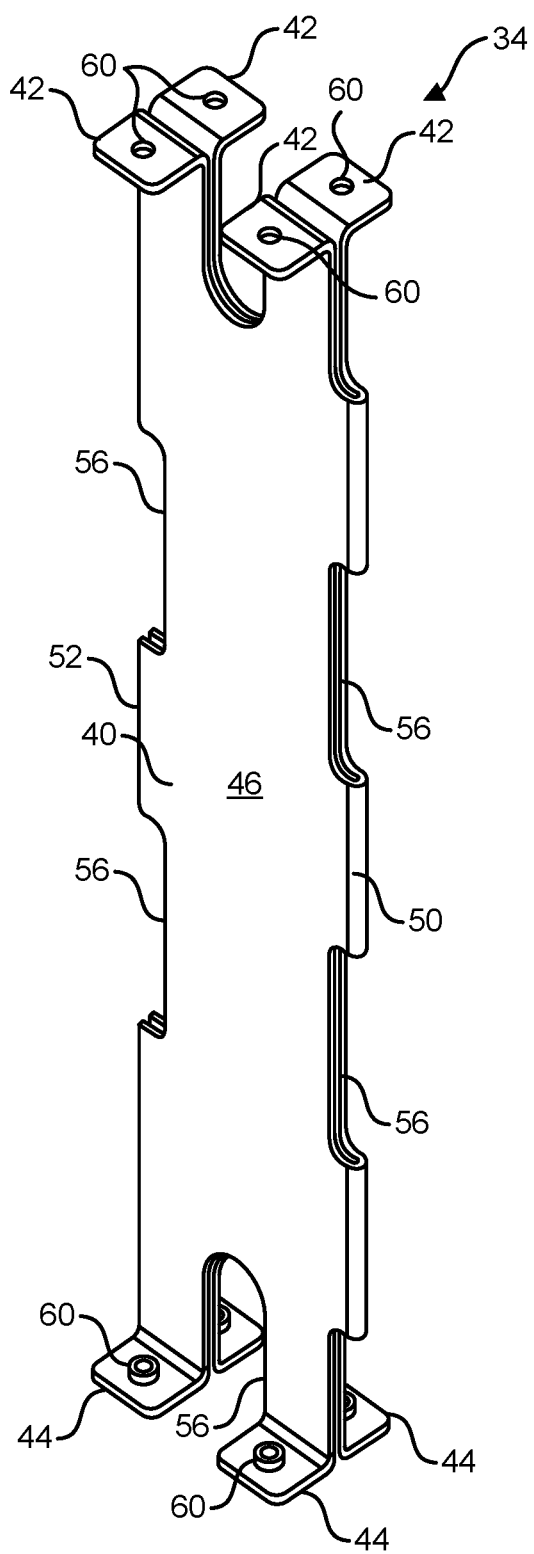
FIG. 3 is an enlarged perspective of the interior upright removed from the guidance sign.

Referring to FIGS. 1 and 2, an illustrated embodiment of a runway guidance sign is indicated generally by reference numeral 10. The runway guidance sign 10 includes a housing, generally indicated at 12, defining an interior space 14 and an opening at a front side 16. In particular, the illustrated housing 10 includes upper and lower walls 20, 22, opposite side walls, 24, 26, and a rear wall or panel 28. The walls 20, 22, 24, 26, respectively, may be formed from thin sheets of metal and secured to one another using, such as by fasteners (e.g., nuts and bolts and/or screws) and/or welding. Flanges extend inward from the upper, lower, and side walls 20, 22, 24, 26, respectively, to define the opening at the front side 16. At least one suitable runway sign panel 30 (one panel is broken away in FIG. 2) is secured to the housing 12 at the front side 16 behind the flanges of the walls 20, 22, 24, 26 to enclose the interior space 14 of the housing, as is generally known in the art. An interior upright, generally indicated at 34, received in the interior space 14 is configured to provide load-bearing support to the upper wall 20. Details of the interior upright 34 are described below. A lighting source 35 (FIG. 2), such as one or more light emitting diodes, are received in the interior space 14 to backlight the sign panel, as is also generally known in the art. The lighting source 35 may be attached to the upper wall 20. The runway guidance sign 10 further includes one or more feet 36, e.g., four feet as illustrated, to elevate the sign above the runway.

Referring to FIGS. 3-6, the interior upright 34 includes a body 40 having a height H, and upper and lower fastening tabs or flanges 42, 44, respectively, at corresponding upper and lower ends of the body. The body 40 is elongate and generally flat or planar. The body 40 has opposite planar side faces 46, 48 and opposite front and rear ends 50, 52. The upper and lower ends and the front and rear ends 50, 52, respectively, of the body 40 define recesses 56 (e.g., cutouts) to provide clearances for structures within the interior space 14 of the housing 12 and/or facilitate bending or folding of the upright 34 during manufacturing, as explained below. The fastening tabs 42, 44 define fastener openings 60 configured to receive a fastener (e.g., a screw or bolt) for securing the interior upright 34 in the housing 12. In particular, the upper fastening tabs 42 are used to secure the upright 34 to the upper wall 20, and the lower fastening tabs 44 are used to secure the upright to the lower wall 22. In the illustrated embodiment, the upright 34 includes four upper fastening tabs 42 (two left fastening tabs and two right fastening tabs) and four lower fastening tabs 44 (two left fastening tabs and two right fastening tabs). The upright 34 may include other suitable numbers of fastening tabs 42, 44 suitable for fastening the upright in the housing 12. As shown in FIGS. 1 and 2, as secured in the housing 12, the planar side faces 46, 48 are generally parallel to the side walls 24, 26 of the housing 12 and extend between the rear wall 28 and the front side 16 of the housing (and the sign panel 30). In FIGS. 1 and 2, the upright 34 is generally centered in the housing 12 and is suitable for providing load-bearing support to the upper wall 20.

Figure 4:
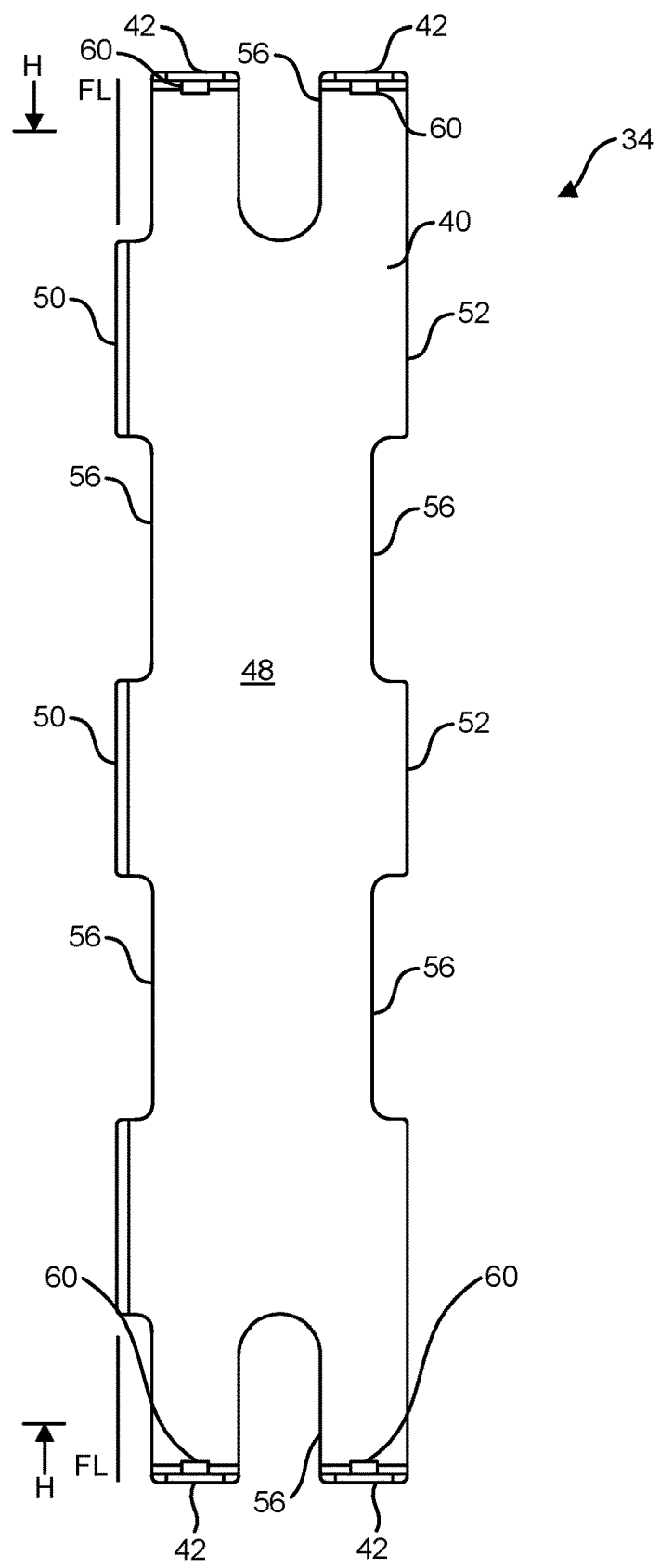
FIG. 4 is a front elevation of the interior upright.
Figure 5:
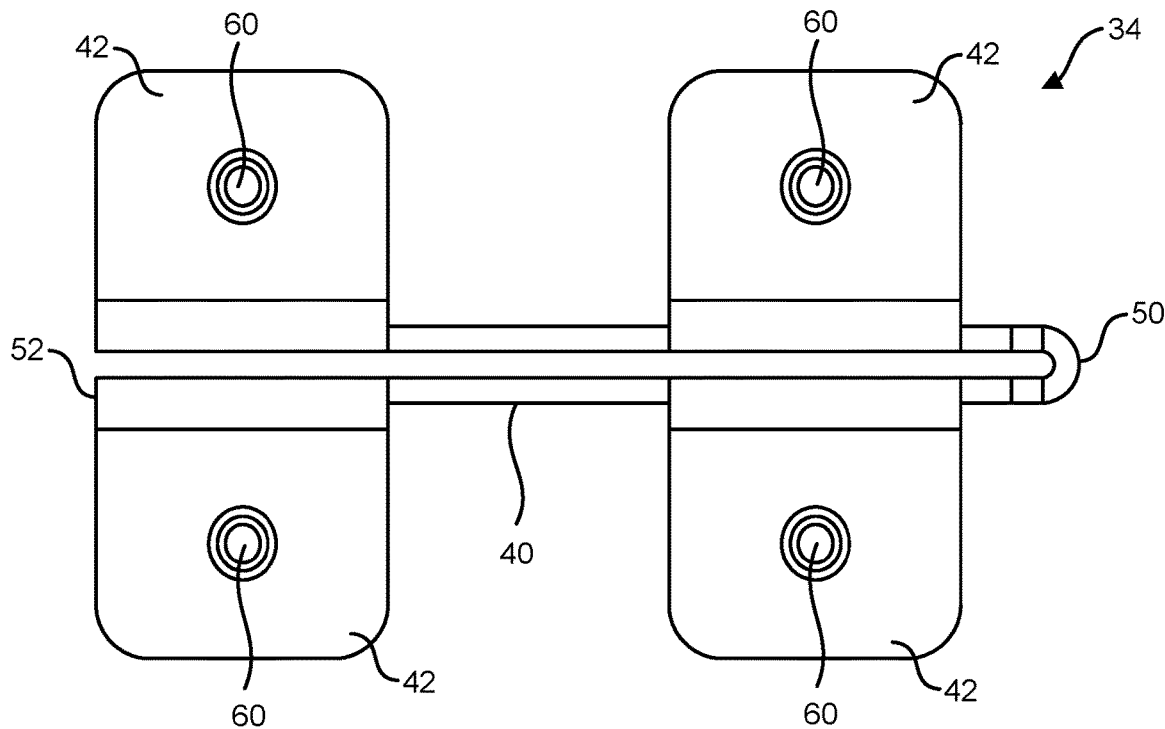
FIG. 5 is a bottom plan view of the interior upright.
Figure 6:
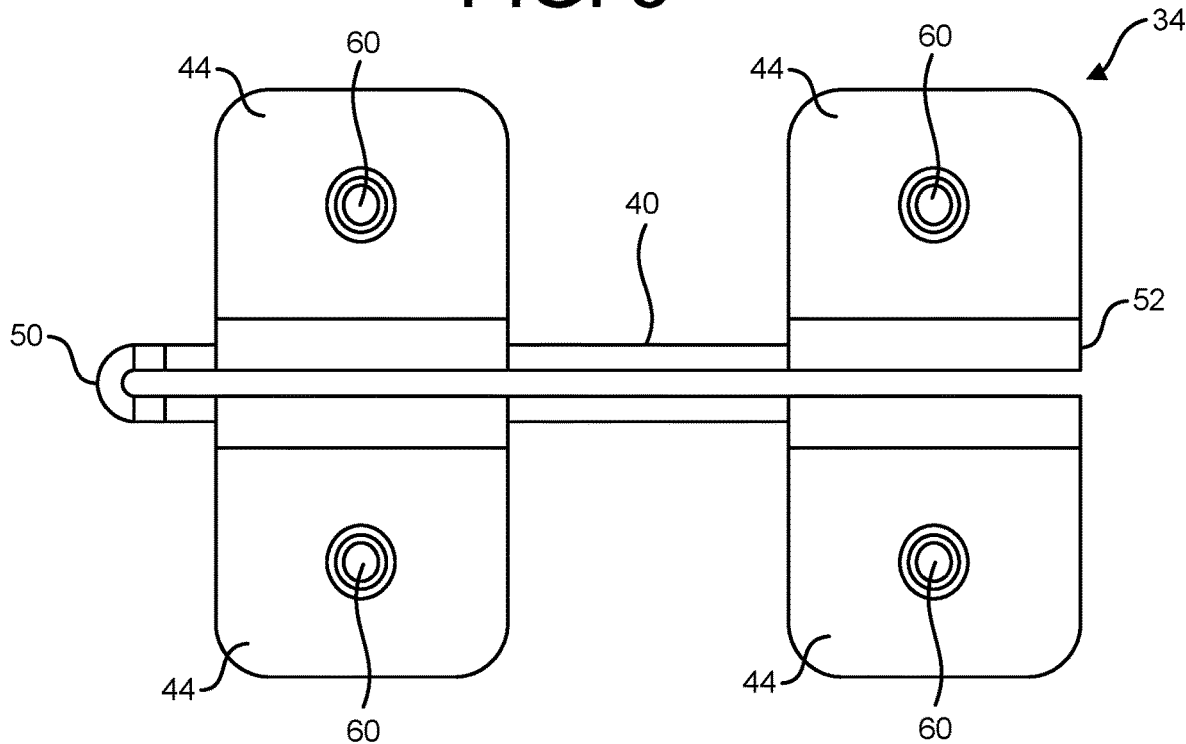
FIG. 6 is a top plan view of the interior upright.

In the illustrated embodiment, the upright 34 is integrally formed from a single sheet of material (e.g., a single sheet of metal). In particular, the single sheet of material includes first and second halves that are mirror images of one another about a vertical fold line FL (FIG. 4). That is, the first and second halves are symmetrical about the vertical fold line FL. The sheet of material is bent or folded about the fold line FL such that the first and second halves are folded over one another to form the upright 34. When formed, the fold line FL is at the one of the front and rear ends 50, 52 and spaced apart living hinges are formed at the corresponding one of the front and rear ends 50, 52. The fastening tabs 42, 44 are bent out of plane so that they extend outward from the respective side faces 46, 48 of the body 40. The upright may be formed in other ways.

Figure 7:
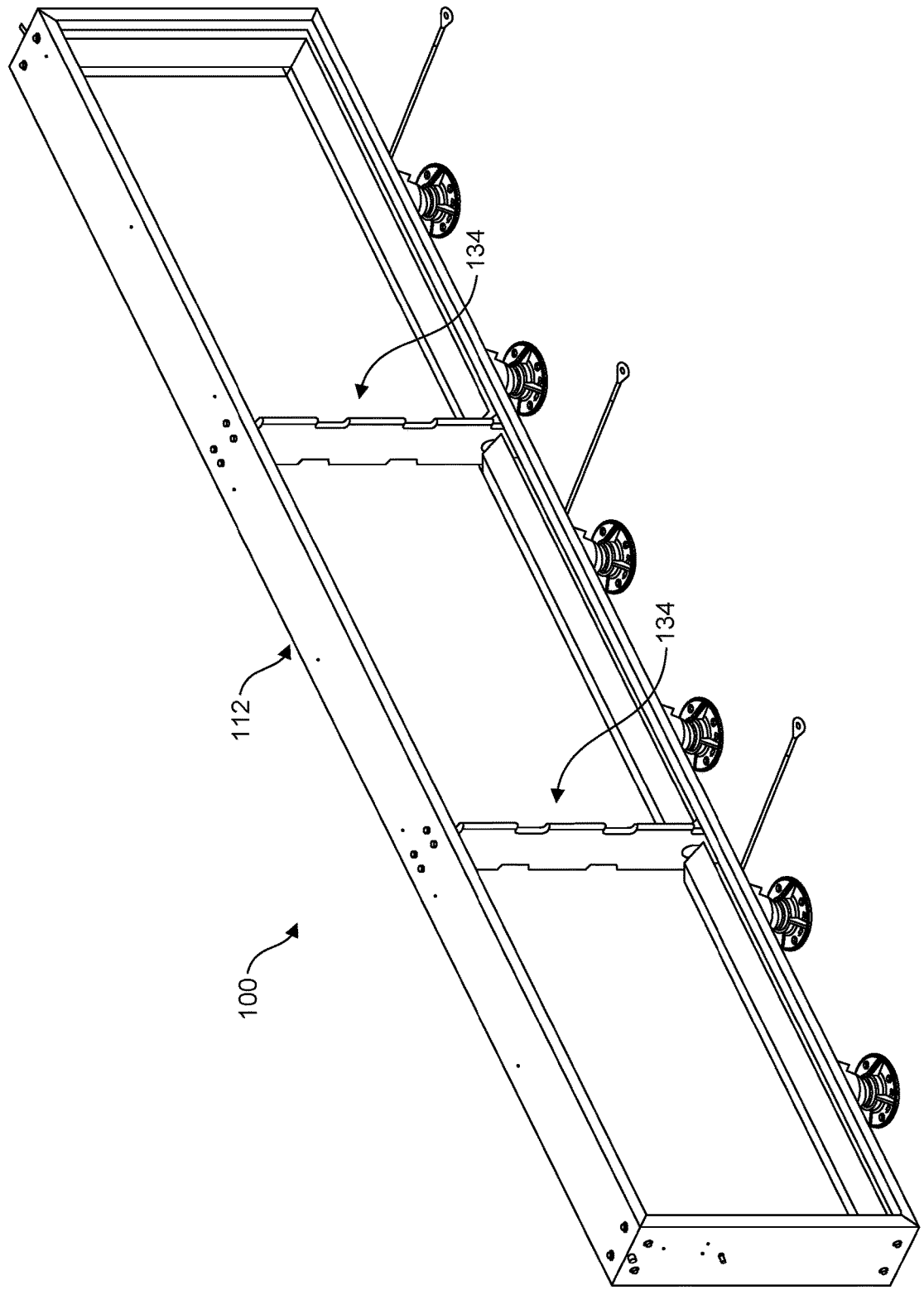
FIG. 7 is a perspective of another embodiment of a guidance sign including two interior uprights.
Figure 8:
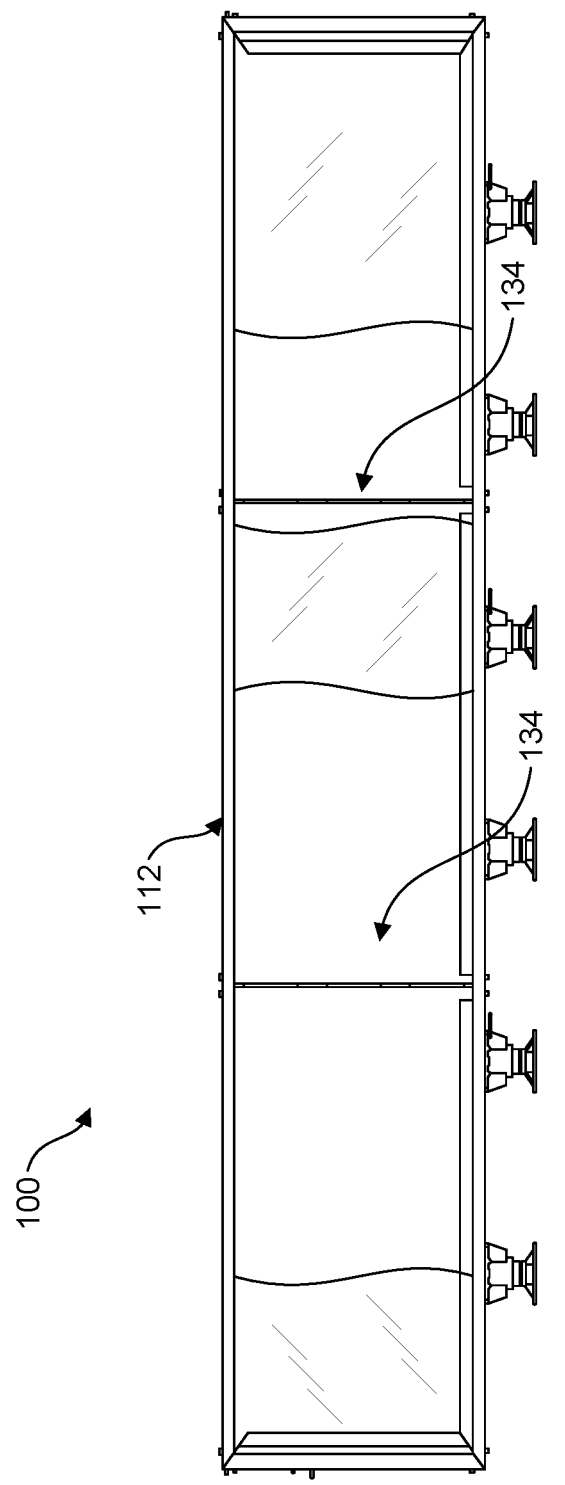
FIG. 8 is a front elevation of the guidance sign of FIG. 7.

Referring to FIGS. 7 and 8, another embodiment of a runway guidance sign is generally indicated at 100. The runway guidance sign 100 is similar to the first runway guidance sign 10, except it is longer than the first runway guidance sign and is suitable for a longer sign panel 130. In this embodiment, the guidance sign 100 includes two interior uprights 134 spaced at ⅓ and ⅔ of the length of the guidance sign to provide suitable load-bearing support to the upper wall 120 of the housing 112. In other embodiments, the guidance sign may have other lengths and any number of interior uprights suitable for providing load-bearing support to the upper wall.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A runway guidance sign comprising:
a housing defining an interior space and an opening at a front side, the housing includes opposite upper and lower walls; and
an interior upright received in the interior space of the housing, the interior upright fastened to and extending between the upper and lower walls, wherein the interior upright is integrally formed from a one-piece sheet of material, and wherein the interior upright comprises a body having opposite planar side faces and opposite front and rear ends, the side faces being free of openings extending therethrough, wherein the interior upright includes a vertical body having first and second halves folded over one another about a fold line; and
recesses in the front and rear ends of the body to provide clearance for structures within the interior space of the housing.

2. The runway guidance sign set forth in claim 1, further comprising a rear wall and a runway guidance sign panel opposing the rear wall and secured to the housing at the front side to enclose the interior space.

3. The runway guidance sign set forth in claim 2, wherein the interior upright is disposed between the rear wall and the runway guidance sign panel.

4. The runway guidance sign set forth in claim 1, wherein the first and second halves are mirror images of one another.

5. The runway guidance sign set forth in claim 1, wherein the interior upright includes a generally planar vertical body, and upper and lower fastening tabs extending outward out of plane from upper and lower ends of the generally planar vertical body.

6. The runway guidance sign set forth in claim 5, wherein the upper and lower fastening tabs are secured to the corresponding upper and lower walls of the housing.

7. The interior upright set forth in claim 5, wherein the upper and lower fastening tabs each define fastener openings.

8. The runway guidance sign set forth in claim 1, wherein the interior upright is integrally formed from a one-piece sheet of metal.

9. The runway guidance sign set forth in claim 1, further comprising a runway guidance sign panel secured to the housing at the front side.

10. The runway guidance sign set forth in claim 9, furthering comprising a light source within the interior space of the housing and configured to backlight the runway guidance sign panel.

11. The runway guidance sign set forth in claim 10, further comprising at least one foot secured to the lower wall of the housing and configured to elevate the housing about a runway.

12. The runway guidance sign set forth in claim 1, wherein the housing further includes opposite side walls extending between the upper and lower walls, and a rear wall.

13. The runway guidance sign set forth in claim 1, further comprising recesses in the front and rear ends of the body to provide clearance for structures within the interior space of the housing.

14. An interior upright for a runway guidance sign having a housing with upper and lower walls, the interior upright comprising:
a vertical body that is generally planar, the vertical body having opposite side faces, opposite front and rear ends, and upper and lower ends;
at least one upper fastening tab extending outward from at least one of the opposite side faces at the upper end of the vertical body, the at least one upper fastening tab configured to be fastened to the upper wall of the housing of the runway guidance sign; and
at least one lower fastening tab extending outward from at least one of the opposite side faces at the lower end of the vertical body, the at least one lower fastening tab configured to be fastened to the lower wall of the housing of the runway guidance sign, wherein the interior upright is sized and shaped to be disposed between the upper and lower walls of the housing of the runway guidance sign and provide load-bearing support to the upper wall, wherein the interior upright is integrally formed from a one-piece sheet of material, wherein the vertical body is free of openings extending through the opposite side faces, and wherein the at least one upper fastening tab and at least one lower fastening tab each define fastener openings.

15. The interior upright set forth in claim 14, vertical body has first and second planar halves folded over one another about a fold line.

16. The interior upright set forth in claim 15, wherein the first and second halves are mirror images of one another.

17. The interior upright set forth in claim 15, wherein the interior upright is integrally formed from a one-piece sheet of metal.

18. A method of making a runway guidance sign comprising:

forming a housing defining an interior space and an opening at a front side, the housing including opposite upper and lower walls;

forming an interior upright from a one-piece sheet of metal, the interior upright including a vertical body that is generally planar, the vertical body having opposite side faces, opposite front and rear ends, and upper and lower ends, the vertical body being free of openings extending through the opposite side faces, at least one upper fastening tab extending outward from at least one of the opposite side faces at the upper end of the vertical body, and at least one lower fastening tab extending outward from at least one of the opposite side faces at the lower end of the vertical body, wherein the at least one upper fastening tab and at least one lower fastening tab each define fastener openings;

fastening the at least one upper fastening tab to the upper wall of the housing within the interior space of the housing; and fastening the at least one lower fastening tab to the lower wall of the housing within the interior space of the housing.

19. The method of making a runway guidance sign set forth in claim 18, wherein said forming the interior upright comprises folding the one-piece sheet of metal about a fold line.

20. The method of making a runway guidance sign set forth in claim 19, wherein said forming the interior upright comprises folding the at least one upper and lower fastening tabs out of plane relative to the vertical body.

\* \* \* \* \*